United States Patent
Huang et al.

(10) Patent No.: US 10,996,433 B2
(45) Date of Patent: May 4, 2021

(54) PROJECTION LENS ASSEMBLY

(71) Applicant: ZHEJIANG SUNNY OPTICAL CO., LTD., Ningbo (CN)

(72) Inventors: Lin Huang, Ningbo (CN); Xinquan Wang, Ningbo (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 166 days.

(21) Appl. No.: 16/231,147

(22) Filed: Dec. 21, 2018

(65) Prior Publication Data

US 2019/0154975 A1 May 23, 2019

Related U.S. Application Data

(63) Continuation of application No. PCT/CN2018/087037, filed on May 16, 2018.

(30) Foreign Application Priority Data

Nov. 21, 2017 (CN) .......................... 201711166983.6
Nov. 21, 2017 (CN) .......................... 201721562706.2

(51) Int. Cl.
  *G02B 13/00* (2006.01)
  *G02B 9/10* (2006.01)
  *G02B 13/16* (2006.01)

(52) U.S. Cl.
  CPC .............. *G02B 13/003* (2013.01); *G02B 9/10* (2013.01); *G02B 13/16* (2013.01); *G02B 13/008* (2013.01)

(58) Field of Classification Search
  CPC .... G02B 13/003; G02B 13/008; G02B 13/16; G02B 9/10
  USPC .......................................................... 359/717
  See application file for complete search history.

(56) References Cited

U.S. PATENT DOCUMENTS

2012/0120504 A1   5/2012   Shih et al.
2012/0229892 A1*  9/2012   Kang .................. G02B 9/10
                                                    359/356

FOREIGN PATENT DOCUMENTS

| CN | 205720845 U   | 11/2016 |
| CN | 107092077 A   | 8/2017  |
| CN | 107121756 A   | 9/2017  |
| CN | 107728295 A   | 2/2018  |
| WO | 2017195730 A1 | 11/2017 |

OTHER PUBLICATIONS

English translation of WO2017/195730, obtained Oct. 5, 2020 on proquest (Year: 2017).*

* cited by examiner

*Primary Examiner* — Kristina M Deherrera
(74) *Attorney, Agent, or Firm* — Hauptman Ham, LLP

(57) ABSTRACT

A projection lens assembly is provided. The projection lens assembly includes sequentially from a source-side to an image-side along an optical axis: a first lens and a second lens. The first lens has a negative refractive power, a source-side surface of the first lens is a concave surface, and an image-side surface of the first lens is a convex surface. The second lens has a positive refractive power, and an image-side surface of the second lens is a convex surface.

16 Claims, 5 Drawing Sheets

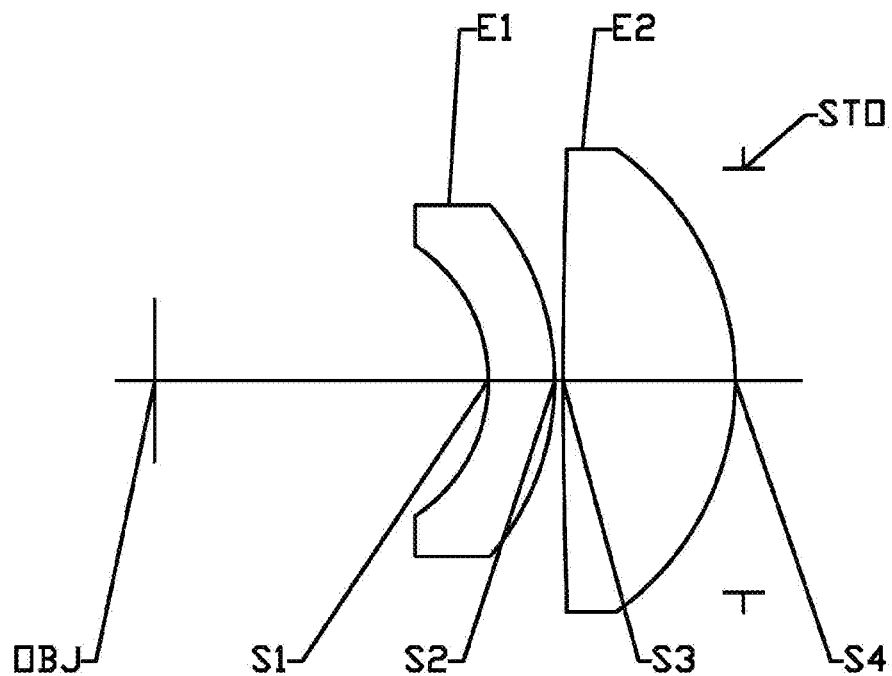
Fig. 5
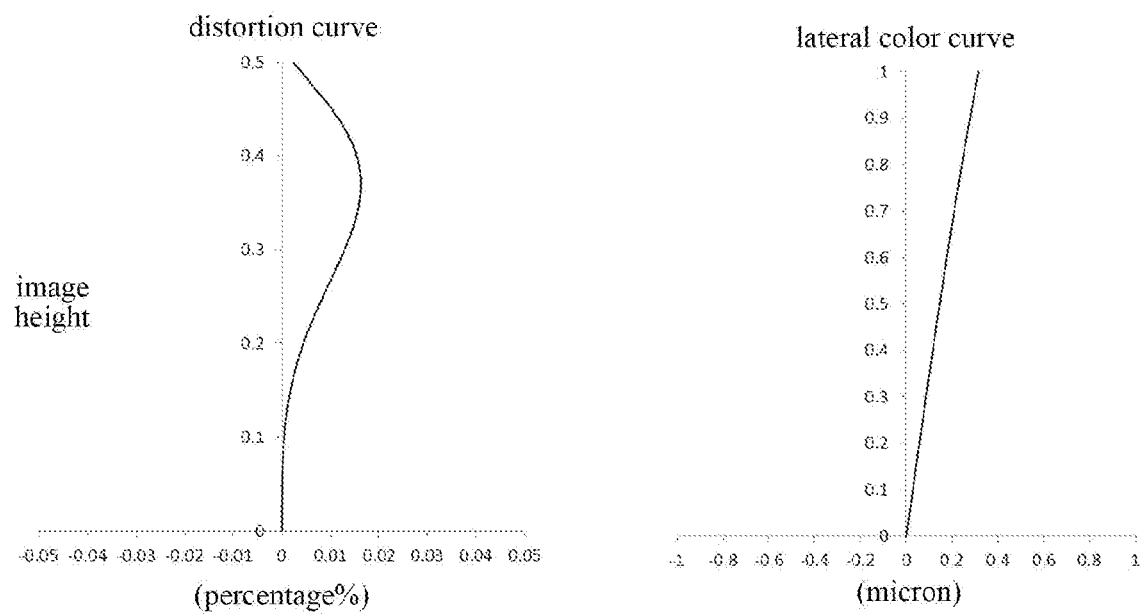
Fig. 6A
Fig. 6B

PROJECTION LENS ASSEMBLY

CROSS-REFERENCE TO RELATED APPLICATIONS

This application is a continuation of International Application No. PCT/CN2018/087037, filed on May 16, 2018, which claims priorities and rights from Chinese Patent Application No. 201711166983.6, filed with the China National Intellectual Property Administration (CNIPA) on Nov. 21, 2017, and Chinese Patent Application No. 201721562706.2 filed with the CNIPA on Nov. 21, 2017. All of the aforementioned applications are hereby incorporated by reference in their entireties.

TECHNICAL FIELD

The present disclosure relates to a projection lens assembly, and specifically to a projection lens assembly including two lenses.

BACKGROUND

With the rapid development of science and technology, interactive devices are gradually rising, and the application range of projection lens assemblies is becoming wider and wider. Nowadays, chip technologies and intelligent algorithms are developing rapidly. By using an optical projection lens assembly to project an image to a space object and receiving a signal of the image, a three-dimensional image with position depth information may be calculated. Three-dimensional images with depth information may be further used in various deep applications and developments such as biometrics.

Conventional projection lens assemblies for imaging typically eliminate various aberrations and improve resolution by increasing the number of lenses. However, increasing the number of lenses causes an increase in the total track length of the projection lens assembly, which is disadvantageous for miniaturization of the lens assembly. In addition, general projection lens assemblies also have many problems such as large distortion and poor imaging quality.

SUMMARY

The present disclosure provides a projection lens assembly that may be applied to portable electronic products and may at least solve or partially solve at least one of the above mentioned disadvantages in the existing technology.

According to an aspect, the present disclosure provides a projection lens assembly. The lens assembly includes, sequentially from a source-side to an image-side along an optical axis, a first lens and a second lens. The first lens may have a negative refractive power, a source-side surface of the first lens may be a concave surface, and an image-side surface of the first lens may be a convex surface. The second lens may have a positive refractive power, and an image-side surface of the second lens may be a convex surface.

In an implementation, an object-side numerical aperture NA of the projection lens assembly may satisfy: NA≥0.18.

In an implementation, a half of a maximal field-of-view HFOV of the projection lens assembly may satisfy: HFOV<15°.

In an implementation, a total track length TTL of the projection lens assembly may satisfy: 3 mm<TTL<3.7 mm.

In an implementation, for a light wave band of 800 nm to 1000 nm, a light transmittance of the projection lens assembly may be greater than 85%.

In an implementation, an effective focal length f2 of the second lens and a total effective focal length f of the projection lens assembly may satisfy: 0.7<f2/f<1.2.

In an implementation, a radius R4 of curvature of the image-side surface of the second lens and a total effective focal length f of the projection lens assembly may satisfy: −0.6<R4/f<−0.2.

In an implementation, a radius R2 of curvature of the image-side surface of the first lens and a radius R1 of curvature of the source-side surface of the first lens may satisfy: (R2−R1)/(R2+R1)<0.5.

In an implementation, an effective half aperture DT22 of the image-side surface of the second lens and an effective half aperture DT21 of a source-side surface of the second lens may satisfy: 1.0<DT22/DT21<1.3.

According to another aspect, the present disclosure further provides a projection lens assembly. The lens assembly includes, sequentially from a source-side to an image-side along an optical axis, a first lens and a second lens. The first lens may have a negative refractive power, a source-side surface of the first lens may be a concave surface, and an image-side surface of the first lens may be a convex surface. The second lens may have a positive refractive power, and an image-side surface of the second lens may be a convex surface. A total track length TTL of the projection lens assembly may satisfy: 3 mm<TTL<3.7 mm.

According to another aspect, the present disclosure further provides a projection lens assembly. The lens assembly includes, sequentially from a source-side to an image-side along an optical axis, a first lens and a second lens. The first lens may have a negative refractive power, a source-side surface of the first lens may be a concave surface, and an image-side surface of the first lens may be a convex surface. The second lens may have a positive refractive power, and an image-side surface of the second lens may be a convex surface. A half of a maximal field-of-view HFOV of the projection lens assembly may satisfy: HFOV<15°.

According to another aspect, the present disclosure further provides a projection lens assembly. The lens assembly includes, sequentially from an source-side to an image-side along an optical axis, a first lens and a second lens. The first lens may have a negative refractive power, a source-side surface of the first lens may be a concave surface, and an image-side surface of the first lens may be a convex surface. The second lens may have a positive refractive power, and an image-side surface of the second lens may be a convex surface. For a light wave band of 800 nm to 1000 nm, a light transmittance of the projection lens assembly may be greater than 85%.

According to another aspect, the present disclosure further provides a projection lens assembly. The lens assembly includes, sequentially from a source-side to an image-side along an optical axis, a first lens and a second lens. The first lens may have a negative refractive power, a source-side surface of the first lens may be a concave surface, and an image-side surface of the first lens may be a convex surface. The second lens may have a positive refractive power, and an image-side surface of the second lens may be a convex surface. A radius of curvature R4 of the image-side surface of the second lens and a total effective focal length f of the projection lens assembly may satisfy: −0.6<R4/f<−0.2.

According to another aspect, the present disclosure further provides a projection lens assembly. The lens assembly includes, sequentially from a source-side to an image-side along an optical axis, a first lens and a second lens. The first lens may have a negative refractive power, a source-side surface of the first lens may be a concave surface, and an image-side surface of the first lens may be a convex surface. The second lens may have a positive refractive power, and an image-side surface of the second lens may be a convex surface. An effective half aperture DT22 of the image-side surface of the second lens and an effective half aperture DT21 of a source-side surface of the second lens may satisfy: 1.0<DT22/DT21<1.3.

In the present disclosure, multiple lenses (e.g., two lenses) are used. By reasonably setting the refractive powers and the surface types of the lenses, the center thicknesses of the lenses and the spacing distances between the lenses, the projection lens assembly may have at least one advantageous effect such as miniaturization, large numerical aperture, and high imaging quality.

BRIEF DESCRIPTION OF THE DRAWINGS

After reading detailed descriptions of non-limiting embodiments with reference to the accompanying drawings, other features, objectives and advantages of the present disclosure will become more apparent. In the accompanying drawings:

FIG. 5 is a schematic structural diagram illustrating a projection lens assembly according to a third embodiment of the present disclosure;

FIGS. 6A-6B respectively illustrate a distortion curve and a lateral color curve of the projection lens assembly according to the third embodiment;

DETAILED DESCRIPTION OF EMBODIMENTS

Figure 1:
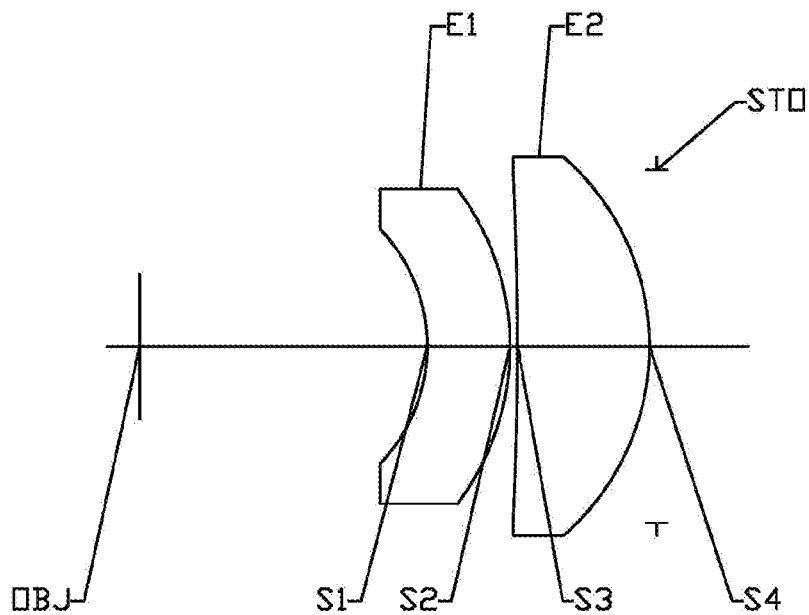
FIG. 1 is a schematic structural diagram illustrating a projection lens assembly according to a first embodiment of the present disclosure.

For better understanding the present disclosure, various aspects of the present disclosure will be described in more detail with reference to the accompanying drawings. It should be understood that the detailed description is merely an illustration of the exemplary implementations of the present disclosure rather than a limitation on the scope of the present disclosure in any way. Throughout the specification, the same reference numerals designate the same elements. The expression "and/or" includes any and all combinations of one or more of the associated listed items.

It should be noted that in the specification, the expressions, such as "first," and "second" are only used to distinguish one feature from another, rather than represent any limitations to the features. Thus, the first lens discussed below may also be referred to as the second lens and the second lens may also be referred to as the first lens without departing from the teachings of the present disclosure.

In the accompanying drawings, the thicknesses, sizes and shapes of the lenses are slightly exaggerated for the convenience of description. Specifically, shapes of spherical surfaces or aspheric surfaces shown in the accompanying drawings are examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

As used herein, the paraxial area refers to an area near the optical axis. If a surface of a lens has a convex surface and a position of the convex surface is not defined, at least the portion of the surface of the lens in the paraxial area is the convex surface; and if the surface of the lens has a concave surface and a position of the concave surface is not defined, at least the portion of the surface of the lens in the paraxial area is the concave surface. The surface closest to the source-side in each lens is referred to as the source-side surface, and the surface closest to the image side in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure are described below in detail.

The projection lens assembly according to exemplary implementations of the present disclosure may include, for example, two lenses having refractive powers, i.e., a first lens and a second lens. The two lenses are arranged in sequence from a source-side to an image-side along an optical axis.

In an exemplary implementation, the first lens may have a negative refractive power, a source-side surface of the first lens is a concave surface, and an image-side surface of the first lens is a convex surface. The second lens has a positive refractive power, and an image-side surface of the second lens is a convex surface.

In an exemplary implementation, the projection lens assembly of the present disclosure may satisfy the conditional expression: HFOV<15°. Here, HFOV is a half of a maximal field-of-view of the projection lens assembly. More specifically, HFOV may further satisfy: 8°<HFOV<12°, for example, 8.5° HFOV≤3°. Satisfying the conditional expression HFOV<15° is beneficial to control and reduce aberrations in the off-axis field-of-view area and improve the projection quality, and is beneficial to improve the imaging quality uniformity and projection depth of focus in the on-axis field-of-view area and the off-axis field-of-view area.

In an exemplary implementation, the projection lens assembly of the present disclosure may satisfy the conditional expression: 3 mm<TTL<3.7 mm. Here, TTL is the total track length of the projection lens assembly. The total track length of the projection lens assembly refers to the axial distance from the center of the image-side surface of the second lens to the image source (for example, the surface of the spatial light modulator for modulating a projection signal). More specifically, TTL may further satisfy: 3.25 mm≤TTL≤3.51 mm. Satisfying the conditional expression 3 mm<TTL<3.7 mm is advantageous for miniaturization of the projection lens assembly, thereby facilitating the projection lens assembly to be more widely used in various portable electronic products.

In an exemplary implementation, the projection lens assembly of the present disclosure may satisfy the conditional expression: 0.7<f2/f<1.2. Here, f2 is the effective focal length of the second lens and f is the total effective focal length of the projection lens assembly. More specifically, f2 and f may further satisfy: 0.80≤f2/f≤1.16. Properly controlling the refractive power of the second lens is conducive to balancing the miniaturization and projection imaging quality of the lens assembly.

In an exemplary implementation, the projection lens assembly of the present disclosure may satisfy the conditional expression: NA≥0.18. Here, NA is the object-side numerical aperture of the projection lens assembly. More specifically, NA may further satisfy: NA=0.20. The projection lens assembly has a large numerical aperture, which may increase the projection energy efficiency, thereby obtaining a projection image with a higher brightness.

In an exemplary implementation, for a light wave band of 800 nm to 1000 nm, the projection lens assembly of the present disclosure has a light transmittance greater than 85%. Such a setting is advantageous for improving the transmittance of near-infrared light through the projection lens assembly, thereby obtaining a near-infrared projection image with a higher brightness.

In an exemplary implementation, the projection lens assembly of the present disclosure may satisfy the conditional expression: −0.6<R4/f<−0.2. Here, R4 is the radius of curvature of the image-side surface of the second lens and f is the total effective focal length of the projection lens assembly. More specifically, R4 and f may further satisfy: −0.54≤R4/f≤−0.40. Properly controlling the ratio of R4 to f is beneficial to reduce the astigmatism of the projection lens assembly and improve the projection imaging quality.

In an exemplary implementation, the projection lens assembly of the present disclosure may satisfy the conditional expression: (R2−R1)/(R2+R1)<0.5. Here, R2 is the radius of curvature of the image-side surface of the first lens and R1 is the radius of curvature of the source-side surface of the first lens. More specifically, R2 and R1 may further satisfy: 0<(R2−R1)/(R2+R1)<0.5, for example, 0.13≤(R2−R1)/(R2+R1)≤0.47. Satisfying the conditional expression (R2−R1)/(R2+R1)<0.5 is advantageous for the fabrication of the first lens; and may avoid an increase of tolerance sensitivity caused by a small radius of curvature.

In an exemplary implementation, the projection lens assembly of the present disclosure may satisfy the conditional expression: 1.0<DT22/DT21<1.3. Here, DT22 is the effective half aperture of the image-side surface of the second lens and DT21 is the effective half aperture of the source-side surface of the second lens. More specifically, DT22 and DT21 may further satisfy: 1.05≤DT22/DT21≤1.19. Satisfying the conditional expression 1.0<DT22/DT21<1.3 is beneficial to avoid the decrease of the imaging quality caused by excessive bending of light; and to avoid problems such as difficulty in processing and manufacturing caused by high tolerance sensitivity.

In an exemplary implementation, the projection lens assembly may further include a diaphragm for improving the imaging quality. The diaphragm may be disposed at any position as desired, for example, the diaphragm may be disposed between the second lens and the image side.

Alternatively, the projection lens assembly may further include other well-known optical projection elements such as prisms, and field lenses.

The projection lens assembly according to the above implementations of the present disclosure may use, for example, two lenses. By reasonably setting the refractive powers, the surface types, the center thicknesses of the lenses, and the axial distances between the lenses, etc., the projection lens assembly may have at least one beneficial effect of miniaturization, large numerical aperture, low sensitivity, high imaging quality, and the like.

In the implementations of the present disclosure, at least one of the surfaces of the lenses is an aspheric surface. The aspheric lens is characterized in that the curvature continuously changes from the center of the lens to the periphery of the lens. In contrast to a spherical lens having a constant curvature from the center of the lens to the periphery of the lens, the aspheric lens has a better radius-of-curvature characteristic, and has advantages of improving a distortion aberration and an astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the projection lens assembly without departing from the technical solution claimed by the present disclosure. For example, although two lenses are described as an example in the implementations, the projection lens assembly is not limited to include two lenses. If desired, the projection lens assembly may also include other numbers of lenses.

Specific embodiments of the projection lens assembly that may be applied to the above implementations are further described below with reference to the accompanying drawings.

First Embodiment

A projection lens assembly according to a first embodiment of the present disclosure is described below with reference to FIGS. 1-2B. FIG. 1 is a schematic structural diagram illustrating a projection lens assembly according to the first embodiment of the present disclosure.

As shown in FIG. 1, the projection lens assembly according to exemplary embodiments of the present disclosure sequentially includes, along the optical axis, from the source-side to the image-side, a first lens E1, a second lens E2, and a diaphragm STO.

The first lens E1 has a negative refractive power, a source-side surface S1 of the first lens E1 is a concave surface, and an image-side surface S2 of the first lens E1 is a convex surface. The second lens E2 has a positive refractive power, a source-side surface S3 of the second lens E2 is a concave surface, and an image-side surface S4 of the second lens E2 is a convex surface. For a light wave band of about 800 nm to 1000 nm, the light transmittance of the projection lens assembly is greater than 85%. Light from the image source sequentially passes through the surfaces S1 to S4 and is finally imaged on an image plane (not shown) such as a projection screen.

Table 1 shows the surface types, the radiuses of curvature, the thicknesses, the material and the conic coefficients of the lenses of the projection lens assembly in the first embodiment. The radiuses of curvature and the thicknesses are shown in millimeters (mm).

TABLE 1

| surface number | surface type | radius of curvature | thickness | material refractive index | abbe number | conic coefficient |
|---|---|---|---|---|---|---|
| OBJ | spherical | infinite | 1.9745 | | | |
| S1 | aspheric | −3.4634 | 0.5679 | 1.53 | 55.8 | −1.2124 |
| S2 | aspheric | −6.1509 | 0.0500 | | | −3.9909 |
| S3 | aspheric | −9.8778 | 0.9076 | 1.53 | 55.8 | 5.0000 |
| S4 | aspheric | −1.3962 | 0.0500 | | | −0.4633 |
| STO | spherical | infinite | 0.0000 | | | |
| IMA | spherical | infinite | | | | |

As can be seen from Table 1, the source-side surface S1 and the image-side surface S2 of the first lens E1 and the source-side surface S3 and the image-side surface S4 of the second lens E2 are all aspheric surfaces. In this embodiment, the surface type x of each aspheric lens may be defined by, but not limited to, the following aspheric formula:

$$x = \frac{ch^2}{1+\sqrt{1-(k+1)c^2h^2}} + \sum A_i h^i \quad (1)$$

Here, x is the sag to the aspheric vertex, when the aspheric surface is at height h from the optical axis; c is the paraxial curvature of the aspheric surface, and c=1/R (i.e., the paraxial curvature c is the reciprocal of the radius R of curvature in Table 1 above); k is the conic coefficient (given in the above Table 1); and $A_i$ is the $i^{th}$ order correction coefficient of the aspheric surface. Table 2 below shows the high-order coefficients $A_4, A_6, A_8, A_{10}$, and $A_{12}$ applicable to the aspheric surfaces S1-S4 in the first embodiment.

TABLE 2

| surface number | A4 | A6 | A8 | A10 | A12 |
|---|---|---|---|---|---|
| S1 | −3.1511E−01 | −4.7845E−01 | 1.1704E+00 | −3.5529E+00 | 3.1022E+00 |
| S2 | −1.9839E−01 | 2.7878E−02 | −1.0343E−01 | 7.7254E−02 | −7.2984E−03 |
| S3 | −4.5669E−03 | 8.2476E−02 | −8.0116E−02 | 5.1704E−02 | −1.8540E−02 |
| S4 | 1.6442E−02 | 1.4075E−02 | 2.1974E−02 | −1.2275E−02 | −7.8684E−04 |

Table 3 shows the total effective focal length f of the projection lens assembly in the first embodiment, the effective focal lengths f1 and f2 of the lenses, the total track length TTL of the projection lens assembly, the half of the maximal field-of-view HFOV of the projection lens assembly, and the object-side numerical aperture NA of the projection lens assembly.

TABLE 3

| parameter | | | | | |
|---|---|---|---|---|---|
| f (mm) | f1 (mm) | f2 (mm) | TTL (mm) | HFOV (°) | NA |
| value 3.19 | −16.01 | 2.93 | 3.50 | 8.9 | 0.20 |

The projection lens assembly in the first embodiment satisfies:

f2/f=0.92, here f2 is the effective focal length of the second lens E2, and f is the total effective focal length of the projection lens assembly;

R4/f=−0.44, here R4 is the radius of curvature of the image-side surface S4 of the second lens E2, and f is the total effective focal length of the projection lens assembly;

(R2−R1)/(R2+R1)=0.28, here R2 is the radius of curvature of the image-side surface S2 of the first lens E1, and R1 is the radius of curvature of the source-side surface S1 of the first lens E1;

DT22/DT21=1.08, here DT22 is the effective half aperture of the image-side surface S4 of the second lens E2, and DT21 is the effective half aperture of the source-side surface S3 of the second lens E2.

Figures 2A, 2B:
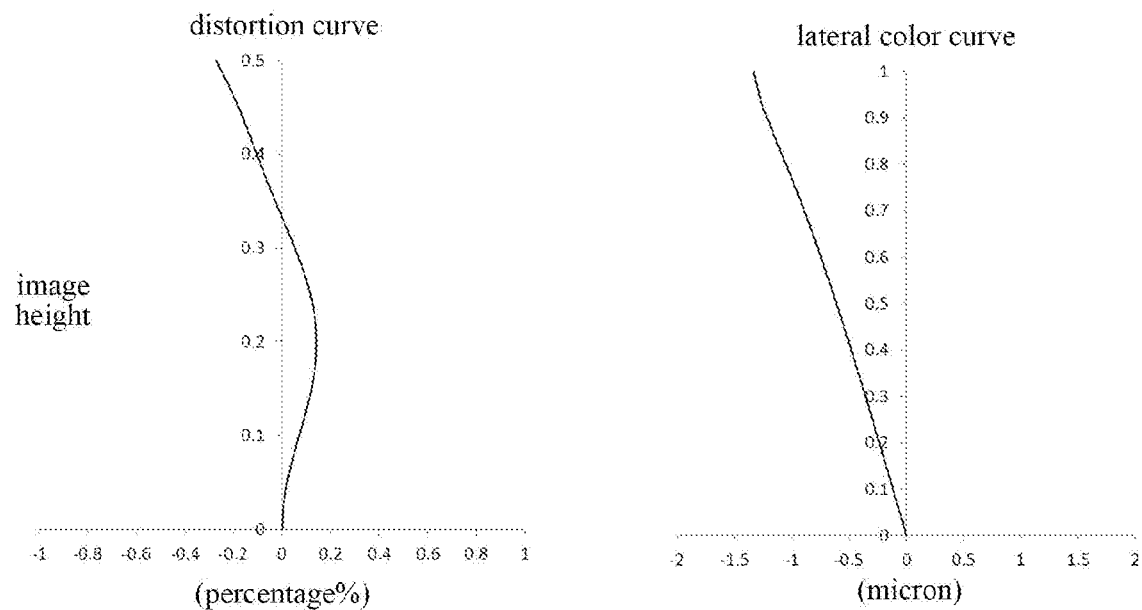
FIGS. 2A-2B respectively illustrate a distortion curve and a lateral color curve of the projection lens assembly according to the first embodiment.

FIG. 2A illustrates the distortion curve of the projection lens assembly according to the first embodiment, representing degrees of distortion at different viewing angles. FIG. 2B illustrates the lateral color curve of the projection lens assembly according to the first embodiment, representing deviations of different heights of images formed by lights passing through the lens assembly and located on the image plane. It can be seen from FIGS. 2A-2B that the projection lens assembly according to the first embodiment can achieve a good imaging quality.

Second Embodiment

Figure 3:
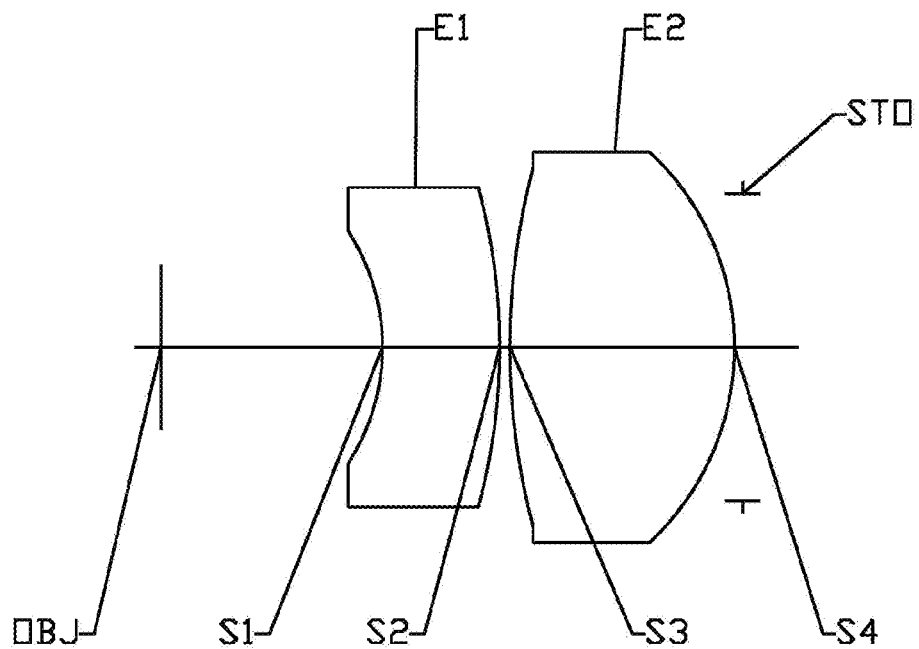
FIG. 3 is a schematic structural diagram illustrating a projection lens assembly according to a second embodiment of the present disclosure.

A projection lens assembly according to a second embodiment of the present disclosure is described below with reference to FIGS. 3-4B. In the present embodiment and the following embodiments, for the purpose of brevity, the description of parts similar to those in the first embodiment will be omitted. FIG. 3 is a schematic structural diagram illustrating the projection lens assembly according to the second embodiment of the present disclosure.

As shown in FIG. 3, the projection lens assembly according to exemplary embodiments of the present disclosure sequentially includes, along the optical axis, from the source-side to the image-side, a first lens E1, a second lens E2, and a diaphragm STO.

The first lens E1 has a negative refractive power, a source-side surface S1 of the first lens E1 is a concave surface, and an image-side surface S2 of the first lens E1 is a convex surface. The second lens E2 has a positive refractive power, a source-side surface S3 of the second lens E2 is a convex surface, and an image-side surface S4 of the second lens E2 is a convex surface. For a light wave band of about 800 nm to 1000 nm, the light transmittance of the projection lens assembly is greater than 85%. Light from the image source sequentially passes through the surfaces S1 to S4 and is finally imaged on an image plane (not shown) such as a projection screen.

Table 4 shows the surface types, the radiuses of curvature, the thicknesses, the material and the conic coefficients of the lenses of the projection lens assembly in the second embodiment. The radiuses of curvature and the thicknesses are shown in millimeters (mm).

TABLE 4

| surface number | surface type | radius of curvature | thickness | material refractive index | abbe number | conic coefficient |
|---|---|---|---|---|---|---|
| OBJ | spherical | infinite | 1.3523 | | | |
| S1 | aspheric | −1.3001 | 0.7152 | 1.53 | 55.8 | 0.0000 |
| S2 | aspheric | −3.6482 | 0.0616 | | | −1.6597 |
| S3 | aspheric | 4.3032 | 1.3710 | 1.53 | 55.8 | 0.0000 |
| S4 | aspheric | −1.6280 | 0.0500 | | | 0.0000 |
| STO | spherical | infinite | 0.0000 | | | |
| IMA | spherical | infinite | | | | |

As can be seen from Table 4, in the second embodiment, the source-side surface S1 and the image-side surface S2 of the first lens E1 and the source-side surface S3 and the image-side surface S4 of the second lens E2 are all aspheric surfaces. Table 5 shows the high-order coefficients of the aspheric surfaces in the second embodiment. Here, the surface types of the aspheric surfaces may be defined by the formula (1) given in the above the first embodiment.

TABLE 5

| surface number | A4 |
|---|---|
| S1 | 0.0000E+00 |
| S2 | −2.6235E−03 |
| S3 | 0.0000E+00 |
| S4 | 0.0000E+00 |

Table 6 shows the effective focal lengths f1 and f2 of the lenses in the second embodiment, the total effective focal length f of the projection lens assembly, the total track length TTL of the projection lens assembly, the half of the maximal field-of-view HFOV of the projection lens assembly, and the object-side numerical aperture NA of the projection lens assembly.

TABLE 6

| | parameter | | | | | |
|---|---|---|---|---|---|---|
| | f (mm) | f1 (mm) | f2 (mm) | TTL (mm) | HFOV (°) | NA |
| value | 2.99 | −4.23 | 2.40 | 3.50 | 11.3 | 0.20 |

Figures 4A, 4B:
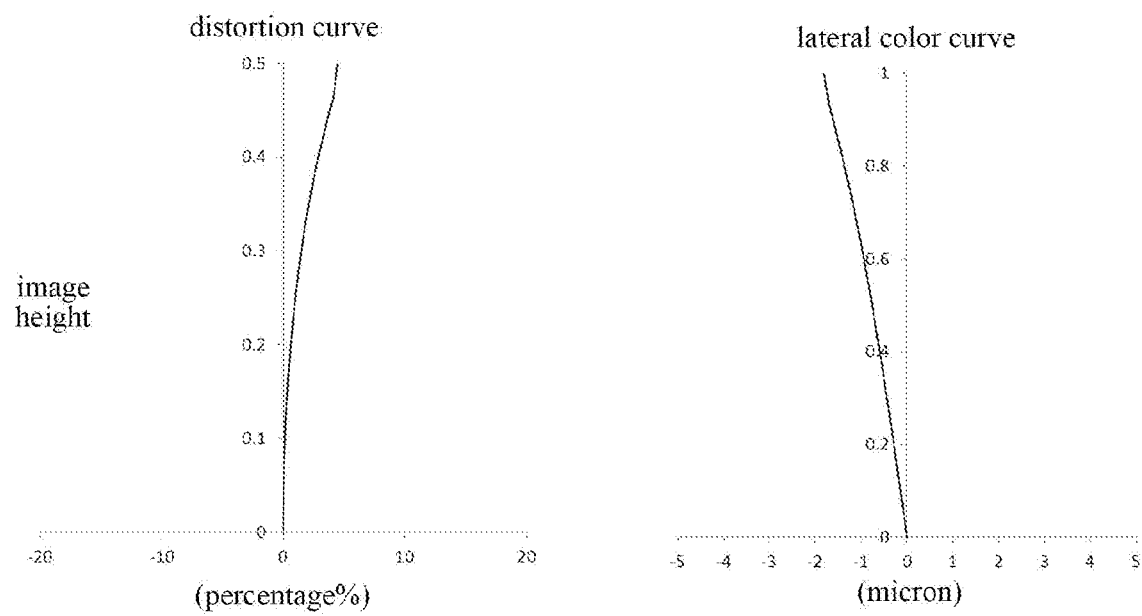
FIGS. 4A-4B respectively illustrate a distortion curve and a lateral color curve of the projection lens assembly according to the second embodiment.

FIG. 4A illustrates the distortion curve of the projection lens assembly according to the second embodiment, representing degrees of distortion at different viewing angles. FIG. 4B illustrates the lateral color curve of the projection lens assembly according to the second embodiment, representing deviations of different heights of images formed by lights passing through the lens assembly and located on the image plane. It can be seen from FIGS. 4A-4B that the projection lens assembly according to the second embodiment can achieve a good imaging quality.

Third Embodiment

A projection lens assembly according to a third embodiment of the present disclosure is described below with reference to FIGS. 5-6B. FIG. 5 is a schematic structural diagram illustrating the projection lens assembly according to the third embodiment of the present disclosure.

As shown in FIG. 5, the projection lens assembly according to exemplary embodiments of the present disclosure sequentially includes, along the optical axis, from the source-side to the image-side, a first lens E1, a second lens E2, and a diaphragm STO.

The first lens E1 has a negative refractive power, a source-side surface S1 of the first lens E1 is a concave surface, and an image-side surface S2 of the first lens E1 is a convex surface. The second lens E2 has a positive refractive power, a source-side surface S3 of the second lens E2 is a concave surface, and an image-side surface S4 of the second lens E2 is a convex surface. For a light wave band of about 800 nm to 1000 nm, the light transmittance of the projection lens assembly is greater than 85%. Light from the image source sequentially passes through the surfaces S1 to S4 and is finally imaged on an image plane (not shown) such as a projection screen.

Table 7 shows the surface types, the radiuses of curvature, the thicknesses, the material and the conic coefficients of the lenses of the projection lens assembly in the third embodiment. The radiuses of curvature and the thicknesses are shown in millimeters (mm).

TABLE 7

| surface number | surface type | radius of curvature | thickness | material refractive index | abbe number | conic coefficient |
|---|---|---|---|---|---|---|
| OBJ | spherical | infinite | 2.0187 | | | |
| S1 | aspheric | −1.1016 | 0.4017 | 1.53 | 55.8 | 0.0000 |
| S2 | aspheric | −1.4775 | 0.0500 | | | 0.0000 |
| S3 | aspheric | −49.7600 | 1.0431 | 1.53 | 55.8 | 0.0000 |
| S4 | aspheric | −1.6166 | 0.0500 | | | 0.0000 |
| STO | spherical | infinite | 0.0000 | | | |
| IMA | spherical | infinite | | | | |

As can be seen from Table 7, in the third embodiment, the source-side surface S1 and the image-side surface S2 of the first lens E1 and the source-side surface S3 and the image-side surface S4 of the second lens E2 are all aspheric surfaces. Table 8 shows the high-order coefficients of the aspheric surfaces in the third embodiment. Here, the surface types of the aspheric surfaces may be defined by the formula (1) given in the above the first embodiment.

TABLE 8

| surface number | A4 | A6 |
|---|---|---|
| S1 | −2.2671E−01 | 8.6171E−02 |
| S2 | −3.5722E−02 | 7.4530E−02 |
| S3 | 5.5129E−02 | −2.4410E−02 |
| S4 | 1.4254E−02 | 4.9197E−03 |

Table 9 shows the effective focal lengths f1 and f2 of the lenses in the third embodiment, the total effective focal length f of the projection lens assembly, the total track length TTL of the projection lens assembly, the half of the maximal field-of-view HFOV of the projection lens assembly, and the object-side numerical aperture NA of the projection lens assembly.

TABLE 9

| | parameter | | | | |
|---|---|---|---|---|---|
| | f (mm) | f1 (mm) | f2 (mm) | TTL (mm) | HFOV (°) | NA |
| value | 3.35 | −13.03 | 3.15 | 3.51 | 8.5 | 0.20 |

FIG. 6A illustrates the distortion curve of the projection lens assembly according to the third embodiment, representing degrees of distortion at different viewing angles. FIG. 6B illustrates the lateral color curve of the projection lens assembly according to the third embodiment, representing deviations of different heights of images formed by lights passing through the lens assembly and located on the image plane. It can be seen from FIGS. 6A-6B that the projection lens assembly according to the third embodiment can achieve a good imaging quality.

Fourth Embodiment

Figure 7:
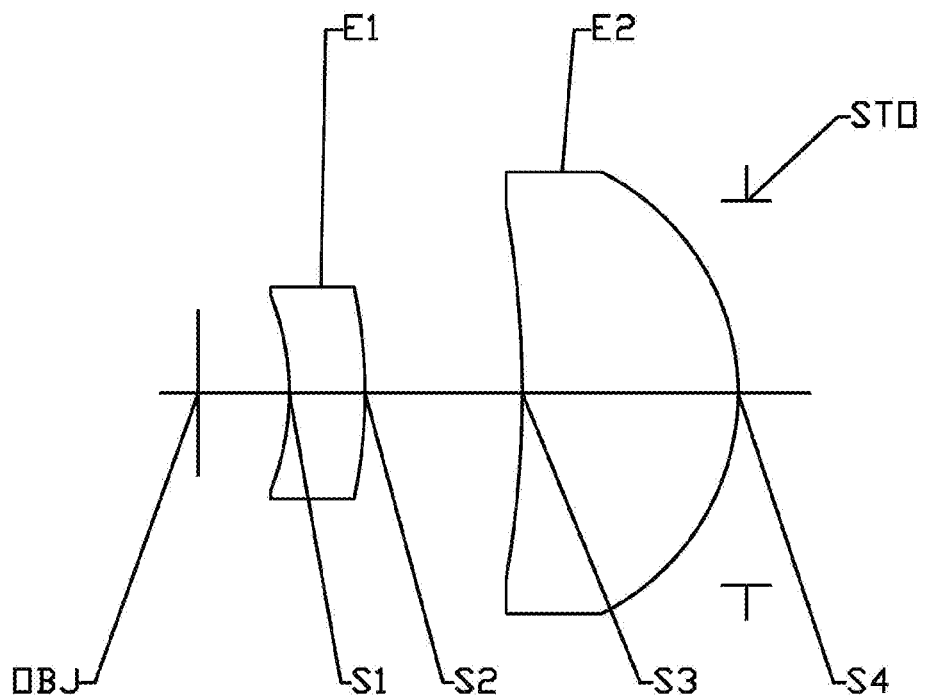
FIG. 7 is a schematic structural diagram illustrating a projection lens assembly according to a fourth embodiment of the present disclosure.

A projection lens assembly according to a fourth embodiment of the present disclosure is described below with reference to FIGS. 7-8B. FIG. 7 is a schematic structural diagram illustrating the projection lens assembly according to the fourth embodiment of the present disclosure.

As shown in FIG. 7, the projection lens assembly according to exemplary embodiments of the present disclosure sequentially includes, along the optical axis, from the source-side to the image-side, a first lens E1, a second lens E2, and a diaphragm STO.

The first lens E1 has a negative refractive power, a source-side surface S1 of the first lens E1 is a concave surface, and an image-side surface S2 of the first lens E1 is a convex surface. The second lens E2 has a positive refractive power, a source-side surface S3 of the second lens E2 is a concave surface, and an image-side surface S4 of the second lens E2 is a convex surface. For a light wave band of about 800 nm to 1000 nm, the light transmittance of the projection lens assembly is greater than 85%. Light from the image source sequentially passes through the surfaces S1 to S4 and is finally imaged on an image plane (not shown) such as a projection screen.

Table 10 shows the surface types, the radiuses of curvature, the thicknesses, the material and the conic coefficients of the lenses of the projection lens assembly in the fourth embodiment. The radiuses of curvature and the thicknesses are shown in millimeters (mm).

TABLE 10

| | | | | material | | |
|---|---|---|---|---|---|---|
| surface number | surface type | radius of curvature | thickness | refractive index | abbe number | conic coefficient |
| OBJ | spherical | infinite | 0.5500 | | | |
| S1 | aspheric | −0.7496 | 0.4559 | 1.53 | 55.8 | −1.1226 |
| S2 | aspheric | −0.9698 | 0.9468 | | | −2.4927 |
| S3 | aspheric | −4.2262 | 1.3000 | 1.53 | 55.8 | 2.2344 |
| S4 | aspheric | −1.3123 | 0.0500 | | | −0.3827 |
| STO | spherical | infinite | 0.0000 | | | |
| IMA | spherical | infinite | | | | |

As can be seen from Table 10, in the fourth embodiment, the source-side surface S1 and the image-side surface S2 of the first lens E1 and the source-side surface S3 and the image-side surface S4 of the second lens E2 are all aspheric surfaces. Table 11 shows the high-order coefficients of the aspheric surfaces in the fourth embodiment. Here, the surface types of the aspheric surfaces may be defined by the formula (1) given in the above the first embodiment.

TABLE 11

| surface number | A4 | A6 | A8 | A10 |
|---|---|---|---|---|
| S1 | 7.4576E−01 | 8.2269E−01 | −5.6806E−01 | −1.4221E−01 |
| S2 | 3.4599E−01 | 8.2827E−01 | −3.3316E−01 | 1.1853E+00 |
| S3 | 9.0238E−02 | −1.1208E−01 | 8.6073E−02 | −2.3359E−02 |
| S4 | 1.0819E−02 | −5.1419E−03 | 3.8858E−04 | 9.7104E−04 |

Table 12 shows the effective focal lengths f1 and f2 of the lenses in the fourth embodiment, the total effective focal length f of the projection lens assembly, the total track length TTL of the projection lens assembly, the half of the maximal field-of-view HFOV of the projection lens assembly, and the object-side numerical aperture NA of the projection lens assembly.

TABLE 12

| | parameter | | | | |
|---|---|---|---|---|---|
| | f (mm) | f1 (mm) | f2 (mm) | TTL (mm) | HFOV (°) | NA |
| value | 2.65 | −22.18 | 3.08 | 3.25 | 10.8 | 0.20 |

Figures 8A, 8B:
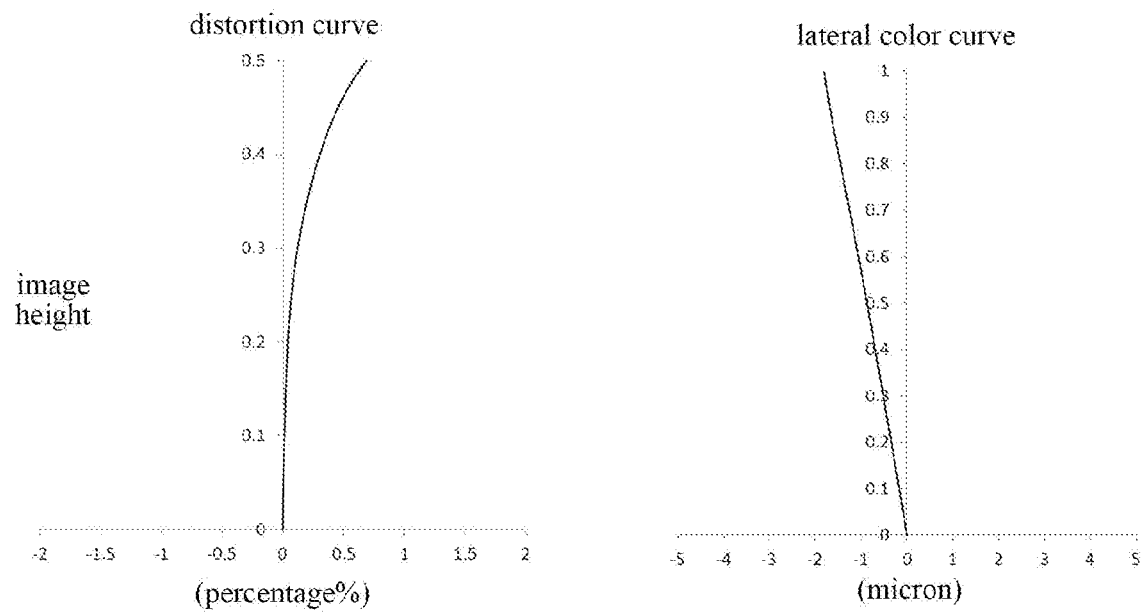
FIGS. 8A-8B respectively illustrate a distortion curve and a lateral color curve of the projection lens assembly according to the fourth embodiment.

FIG. 8A illustrates the distortion curve of the projection lens assembly according to the fourth embodiment, representing degrees of distortion at different viewing angles. FIG. 8B illustrates the lateral color curve of the projection lens assembly according to the fourth embodiment, representing deviations of different heights of images formed by lights passing through the lens assembly and located on the image plane. It can be seen from FIGS. 8A-8B that the projection lens assembly according to the fourth embodiment can achieve a good imaging quality.

Fifth Embodiment

Figure 9:
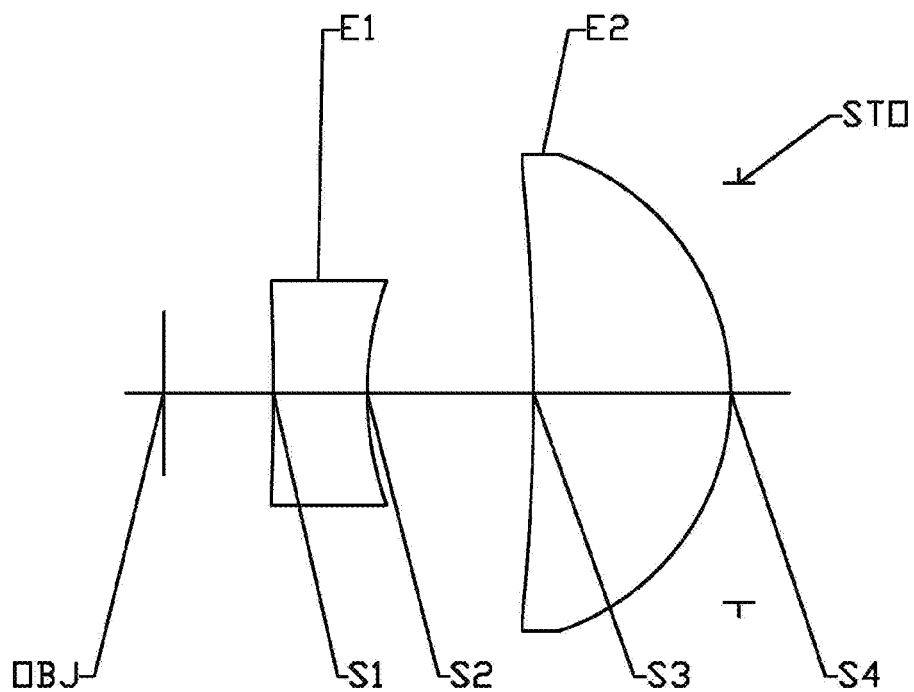
FIG. 9 is a schematic structural diagram illustrating a projection lens assembly according to a fifth embodiment of the present disclosure.

A projection lens assembly according to the fifth embodiment of the present disclosure is described below with reference to FIGS. 9-10B. FIG. 9 is a schematic structural diagram illustrating the projection lens assembly according to the fifth embodiment of the present disclosure.

As shown in FIG. 9, the projection lens assembly according to exemplary embodiments of the present disclosure sequentially includes, along the optical axis, from the source-side to the image-side, a first lens E1, a second lens E2, and a diaphragm STO.

The first lens E1 has a negative refractive power, a source-side surface S1 of the first lens E1 is a concave surface, and an image-side surface S2 of the first lens E1 is a convex surface. The second lens E2 has a positive refractive power, a source-side surface S3 of the second lens E2 is a concave surface, and an image-side surface S4 of the second lens E2 is a convex surface. For a light wave band of about 800 nm to 1000 nm, the light transmittance of the projection lens assembly is greater than 85%. Light from the image source sequentially passes through the surfaces S1 to S4 and is finally imaged on an image plane (not shown) such as a projection screen.

Table 13 shows the surface types, the radiuses of curvature, the thicknesses, the material and the conic coefficients of the lenses of the projection lens assembly in the fifth embodiment. The radiuses of curvature and the thicknesses are shown in millimeters (mm).

TABLE 13

| surface number | surface type | radius of curvature | thickness | material refractive index | abbe number | conic coefficient |
|---|---|---|---|---|---|---|
| OBJ | spherical | infinite | 0.6675 | | | |
| S1 | aspheric | −1.5185 | 0.5703 | 1.53 | 55.8 | 0.6675 |
| S2 | aspheric | −3.3696 | 1.0121 | | | 0.5703 |
| S3 | aspheric | −4.0596 | 1.2000 | 1.53 | 55.8 | 1.0121 |
| S4 | aspheric | −1.2761 | 0.0500 | | | 1.2000 |
| STO | spherical | infinite | 0.0000 | | | |
| IMA | spherical | infinite | | | | |

As can be seen from Table 13, in the fifth embodiment, the source-side surface S1 and the image-side surface S2 of the first lens E1 and the source-side surface S3 and the image-side surface S4 of the second lens E2 are all aspheric surfaces. Table 14 shows the high-order coefficients of the aspheric surfaces in the fifth embodiment. Here, the surface types of the aspheric surfaces may be defined by the formula (1) given in the above the first embodiment.

TABLE 14

| surface number | A4 | A6 | A8 | A10 | A12 | A14 | A16 |
|---|---|---|---|---|---|---|---|
| S1 | 1.0312E+00 | −1.4399E+00 | 9.9617E+00 | −5.1343E+01 | 1.5539E+02 | −2.5274E+02 | 1.5977E+02 |
| S2 | 8.2510E−01 | −4.9940E−01 | 9.6016E+00 | −5.6121E+01 | 1.8908E+02 | −3.1914E+02 | 2.0013E+02 |
| S3 | 4.3806E−02 | −5.7311E−02 | 9.6542E−02 | −7.9879E−02 | 4.1774E−02 | −1.2636E−02 | 1.6612E−03 |
| S4 | −1.6735E−02 | −1.5435E−02 | 1.6578E−02 | −2.5667E−02 | 2.2051E−02 | −1.0380E−02 | 2.0921E−03 |

Table 15 shows the effective focal lengths f1 and f2 of the lenses in the fifth embodiment, the total effective focal length f of the projection lens assembly, the total track length TTL of the projection lens assembly, the half of the maximal field-of-view HFOV of the projection lens assembly, and the object-side numerical aperture NA of the projection lens assembly.

TABLE 15

| | parameter | | | | | |
|---|---|---|---|---|---|---|
| | f (mm) | f1 (mm) | f2 (mm) | TTL (mm) | HFOV (°) | NA |
| value | 3.17 | −5.79 | 3.03 | 3.45 | 9.1 | 0.20 |

Figures 10A, 10B:
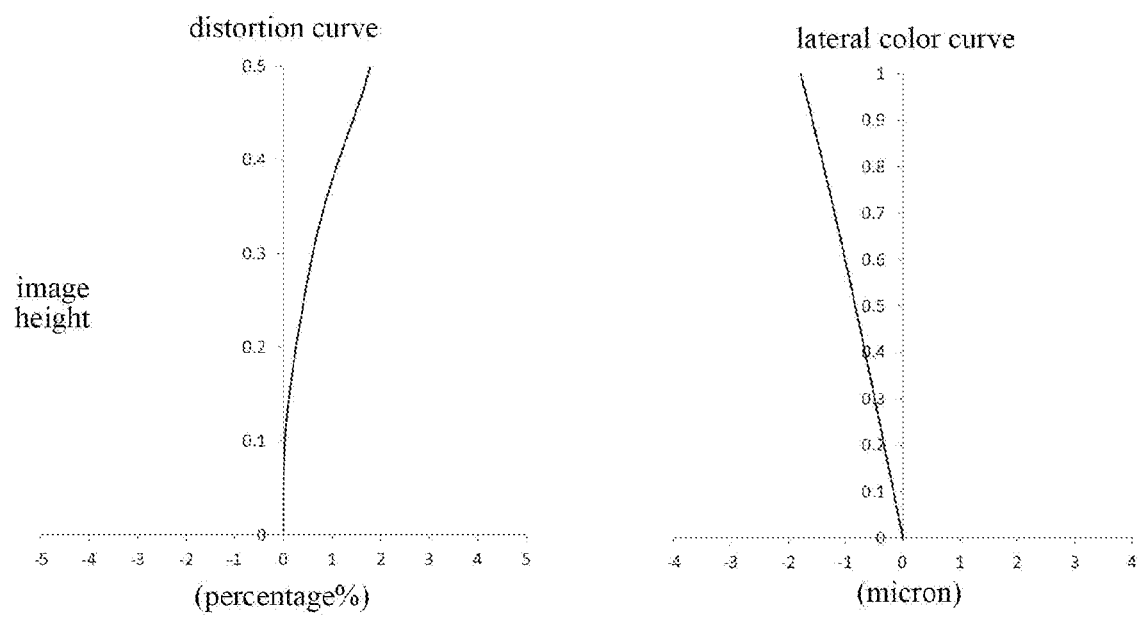
FIGS. 10A-10B respectively illustrate a distortion curve and a lateral color curve of the projection lens assembly according to the fifth embodiment.

FIG. 10A illustrates the distortion curve of the projection lens assembly according to the fifth embodiment, representing degrees of distortion at different viewing angles. FIG. 10B illustrates the lateral color curve of the projection lens assembly according to the fifth embodiment, representing deviations of different heights of images formed by lights passing through the lens assembly and located on the image plane. It can be seen from FIGS. 10A-10B that the projection lens assembly according to the fifth embodiment can achieve a good imaging quality.

To sum up, Embodiments 1-5 respectively satisfy the relationships shown in Table 16 below.

TABLE 16

| conditional expression | embodiment | | | | |
|---|---|---|---|---|---|
| | 1 | 2 | 3 | 4 | 5 |
| HFOV (°) | 8.9 | 11.3 | 8.5 | 10.8 | 9.1 |
| TTL (mm) | 3.50 | 3.50 | 3.51 | 3.25 | 3.45 |
| NA | 0.20 | 0.20 | 0.20 | 0.20 | 0.20 |
| f2/f | 0.92 | 0.80 | 0.94 | 1.16 | 0.95 |
| R4/f | −0.44 | −0.54 | −0.48 | −0.50 | −0.40 |
| (R2 − R1)/(R2 + R1) | 0.28 | 0.47 | 0.15 | 0.13 | 0.38 |
| DT22/DT21 | 1.08 | 1.08 | 1.08 | 1.19 | 1.05 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. A projection lens assembly comprising, from a source-side to an image-side along an optical axis, a first lens and a second lens sequentially, wherein, the first lens has a negative refractive power, a source-side surface of the first lens is a concave surface, and an image-side surface of the first lens is a convex surface; and the second lens has a positive refractive power, and an image-side surface of the second lens is a convex surface, wherein a half of a maximum field-of-view HFOV of the projection lens assembly satisfies: HFOV<15°.

2. The projection lens assembly according to claim 1, wherein an object-side numerical aperture NA of the projection lens assembly satisfies: NA≥0.18.

3. The projection lens assembly according to claim 2, wherein a total track length TTL of the projection lens assembly satisfies: 3 mm<TTL<3.7 mm.

4. The projection lens assembly according to claim 1, wherein for a light wave band of 800 nm to 1000 nm, a light transmittance of the projection lens assembly is greater than 85%.

5. The projection lens assembly according to claim 1, wherein an effective focal length f2 of the second lens and a total effective focal length f of the projection lens assembly satisfy: $0.7<f2/f<1.2$.

6. The projection lens assembly according to claim 1, wherein a radius R4 of curvature of the image-side surface of the second lens and a total effective focal length f of the projection lens assembly satisfy: $-0.6<R4/f<-0.2$.

7. The projection lens assembly according to claim 1, wherein a radius R2 of curvature of the image-side surface of the first lens and a radius R1 of curvature of the source-side surface of the first lens satisfy: $(R2-R1)/(R2+R1)<0.5$.

8. The projection lens assembly according to claim 1, wherein an effective half aperture DT22 of the image-side surface of the second lens and an effective half aperture DT21 of a source-side surface of the second lens satisfy: $1.0<DT22/DT21<1.3$.

9. A projection lens assembly comprising, from a source-side to an image-side along an optical axis, a first lens and a second lens sequentially, wherein,
the first lens has a negative refractive power, a source-side surface of the first lens is a concave surface, and an image-side surface of the first lens is a convex surface;
the second lens has a positive refractive power, and an image-side surface of the second lens is a convex surface; and
wherein a total track length TTL of the projection lens assembly satisfies: $3\ mm<TTL<3.7\ mm$.

10. The projection lens assembly according to claim 9, wherein a half of a maximum field-of-view HFOV of the projection lens assembly satisfies: $HFOV<15°$.

11. The projection lens assembly according to claim 10, wherein an object-side numerical aperture NA of the projection lens assembly satisfies: $NA \geq 0.18$.

12. The projection lens assembly according to claim 9, wherein for a light wave band of 800 nm to 1000 nm, a light transmittance of the projection lens assembly is greater than 85%.

13. The projection lens assembly according to claim 9, wherein a radius R2 of curvature of the image-side surface of the first lens and a radius of curvature R1 of the source-side surface of the first lens satisfy: $(R2-R1)/(R2+R1)<0.5$.

14. The projection lens assembly according to claim 9, wherein an effective half aperture DT22 of the image-side surface of the second lens and an effective half aperture DT21 of a source-side surface of the second lens satisfy: $1.0<DT22/DT21<1.3$.

15. The projection lens assembly according to claim 9, wherein a radius R4 of curvature of the image-side surface of the second lens and a total effective focal length f of the projection lens assembly satisfy: $-0.6<R4/f<-0.2$.

16. The projection lens assembly according to claim 9, wherein an effective focal length f2 of the second lens and a total effective focal length f of the projection lens assembly satisfy: $0.7<f2/f<1.2$.

* * * * *